(12) United States Patent
Ohlendorf et al.

(10) Patent No.: US 12,505,841 B2
(45) Date of Patent: Dec. 23, 2025

(54) APPENDING ASSISTANT SERVER REQUESTS, FROM A CLIENT ASSISTANT, WITH PROACTIVELY-AGGREGATED PERIPHERAL DEVICE DATA

(71) Applicant: GOOGLE LLC, Mountain View, CA (US)

(72) Inventors: Max Ohlendorf, Emerald Hills, CA (US); Moses Derkalousdian, San Diego, CA (US); Aleksey Shaporev, Cambridge, MA (US); Blair Kutzman, San Diego, CA (US); Michael Kartoz, Surprise, AZ (US); Sumit Kumar Pathak, Bengaluru (IN)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/620,628

(22) Filed: Mar. 28, 2024

(65) Prior Publication Data
US 2024/0242720 A1 Jul. 18, 2024

Related U.S. Application Data

(63) Continuation of application No. 17/534,191, filed on Nov. 23, 2021, now Pat. No. 11,978,450.

(60) Provisional application No. 63/233,630, filed on Aug. 16, 2021.

(51) Int. Cl.
*G10L 15/22* (2006.01)
*G10L 15/30* (2013.01)

(52) U.S. Cl.
CPC .............. *G10L 15/22* (2013.01); *G10L 15/30* (2013.01); *G10L 2015/223* (2013.01)

(58) Field of Classification Search
CPC ... G10L 15/22; G10L 15/30; G10L 2015/223; G10L 2015/088
See application file for complete search history.

(56) References Cited

U.S. PATENT DOCUMENTS

| 10,490,187 B2 * | 11/2019 | Laurens .................. G06F 3/167 |
| 10,692,493 B2 | 6/2020 | Swierk |
| 10,867,604 B2 | 12/2020 | Smith |
| 2021/0168224 A1 * | 6/2021 | Nalliannan ............. H04L 69/06 |
| 2022/0164162 A1 * | 5/2022 | Ramasubramanian ...................... G06F 1/3287 |

(Continued)

*Primary Examiner* — Abul K Azad
(74) *Attorney, Agent, or Firm* — Gray Ice Higdon

(57) ABSTRACT

Implementations relate to proactively aggregating client device data to append to client assistant data that is communicated to a server device in response to a user request to a client automated assistant. When a user request that is associated with, for example, a peripheral client device, is received at a client device, the client device can communicate, to a server device, data that embodies the user request (e.g., audio data and/or local speech recognition data), along with peripheral device data that was received before the client device received the user request. In this way, the client automated assistant can bypass expressly soliciting peripheral device data each time a user request is received at another client device. Instead, a peripheral device can proactively communicate device data to a client device so that the device data can be appended to request data communicated to the server device from a particular client device.

18 Claims, 6 Drawing Sheets

(56) References Cited

U.S. PATENT DOCUMENTS

2023/0046055 A1  2/2023  Ohlendorf et al.

* cited by examiner

APPENDING ASSISTANT SERVER REQUESTS, FROM A CLIENT ASSISTANT, WITH PROACTIVELY-AGGREGATED PERIPHERAL DEVICE DATA

BACKGROUND

Humans can engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") can provide commands and/or requests to an automated assistant using spoken natural language input (i.e., utterances), which may in some cases be converted into text and then processed, and/or by providing textual (e.g., typed) natural language input.

Some peripheral devices, such as watches and headphones, are equipped with microphones and/or other interfaces for detecting whether a user is invoking an automated assistant. For instance, a peripheral device may be pre-loaded with a voice detection model for detecting an invocation phrase (e.g., "Hey, Assistant . . . ") that is directed to the automated assistant. In response to detecting an invocation phrase, the peripheral device may communicate with a client device over a communication channel (e.g., Bluetooth or a direct wired connection) and, depending on the request, the client device may off-load certain processing tasks to a server device. Although this can be a useful way to invoke the automated assistant at the client device, further redundant interactions may occur when a peripheral device is involved—particularly when the client or the server requests additional information from the peripheral device to answer the user's query.

For example, when a user invokes their automated assistant via the peripheral device for checking a setting of the peripheral device (e.g., "Hey Assistant, is noise canceling active?"), there may be unnecessary latency before the user receives a response. For instance, audio data corresponding to a spoken utterance from the user may be communicated from the client device to the server device for undergoing natural language understanding (NLU) and/or automatic speech recognition (ASR) processing. The client device may not determine that the spoken utterance from the user requires additional information from the peripheral device until the server device provides responsive data back to the client device. At this time, the client device may query the peripheral device for state data, and communicate this state data back to the server device for generating an assistant response (e.g., using text-to-speech processing). When additional responsive data is received from the server device, the client device may finally render an audible response from the automated assistant (e.g., "Yes, noise cancellation is set to 50%."). Considering state data was available for the client device to access at any time during these transactions, these multiple communications between the client device and the server device may be wasteful. For instance, computational resources such as network bandwidth and battery charge may be unnecessarily consumed in such scenarios.

SUMMARY

Implementations set forth herein relate to proactively aggregating peripheral device data for enabling an automated assistant to respond, with reduced latency, to user inputs related to a peripheral device. The peripheral device can proactively provide status data to a client device that includes an automated assistant application, and the status data can be used to identify one or more settings of the peripheral device. Alternatively, or additionally, the client device can proactively request the status data from the peripheral device, without a user necessarily requesting that the client device retrieve the status data. The client device can therefore retain the status data ahead of a user input that is associated with the peripheral device, such as a request for the automated assistant to control the peripheral device.

For example, a user can provide a spoken utterance to a client device (e.g., a cellular phone) to determine how much battery charge is left in a particular peripheral device (e.g., a watch). For instance, the user can provide a spoken utterance such as, "Assistant, how much charge is left in my watch?" In response to receiving the spoken utterance, the automated assistant at the client device can provide client assistant data to a server device for processing. The client assistant data can include input data characterizing the spoken utterance provided by the user and peripheral device data that characterizes multiple different states and/or multiple different settings of the peripheral device. The peripheral device data can be based on data received from the peripheral device before the user provided the spoken utterance. The data received from the peripheral device can indicate a status of the peripheral device and/or characterize one or more settings (e.g., a current level of noise cancelation) and/or operations of the peripheral device. For example, the data from the peripheral device can indicate: how much battery charge is available at the peripheral device, details of any active operating modes of the peripheral device (such as noise cancellation, ambient noise boost, equalizer settings, etc.), whether the peripheral device is operating in a "do not disturb" mode, and/or health statistics of the user (with prior permission from the user).

In some implementations, the data from the peripheral device can be provided proactively to a client device, without necessitating that a user first provide a request associated with the peripheral device. The data can be provided by the peripheral device in a first format (e.g., a binary message format), and the client device can convert the data into a second format (e.g., a non-binary message format) before providing the data to the server device. Alternatively, or additionally, the client device can receive an amount of information from the peripheral device and can provide less than the total amount of information to the server device. For instance, in response to the spoken utterance, "Assistant, how much charge is left in my watch?", the client device may communicate all the data received from the peripheral device, along with the input data, to the server device. Alternatively, in response to the aforementioned spoken utterance, the client device may communicate less than all of the received peripheral device data to the server device, optionally depending on whether one or more conditions are satisfied.

The server device can perform natural language processing on the input data and the peripheral device data to generate responsive data that can be used by the client device for rendering a response to the user. For example, NLU and/or ASR processing can be performed on the input data for identifying one or more operations that the user is requesting the automated assistant to perform. When the server device determines that the user is requesting information regarding the peripheral device (e.g., the watch), the server device can process the peripheral device data to identify the information that the user is requesting. The information can then be used by the server device to generate the responsive data in a way that would inform the user of the information they are requesting regarding their peripheral device. For example, based on receiving the responsive data from the server device, the automated assistant can employ the client device to render a responsive output such as, "The charge in your battery is at 57%." Alternatively, or additionally, the responsive data can be generated with instructions for modifying a setting of the peripheral device (e.g., setting or adjusting the current level of noise cancelation). By allowing the peripheral device to proactively provide status data to the client device, the automated assistant can exhibit less latency when providing responses to queries related to the peripheral device and also reduce implementation complexity of firmware at the peripheral device.

The above description is provided as an overview of some implementations of the present disclosure. Further description of those implementations, and other implementations, are provided in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers (e.g., peripheral device(s), smartphone(s), and/or server device(s)) that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
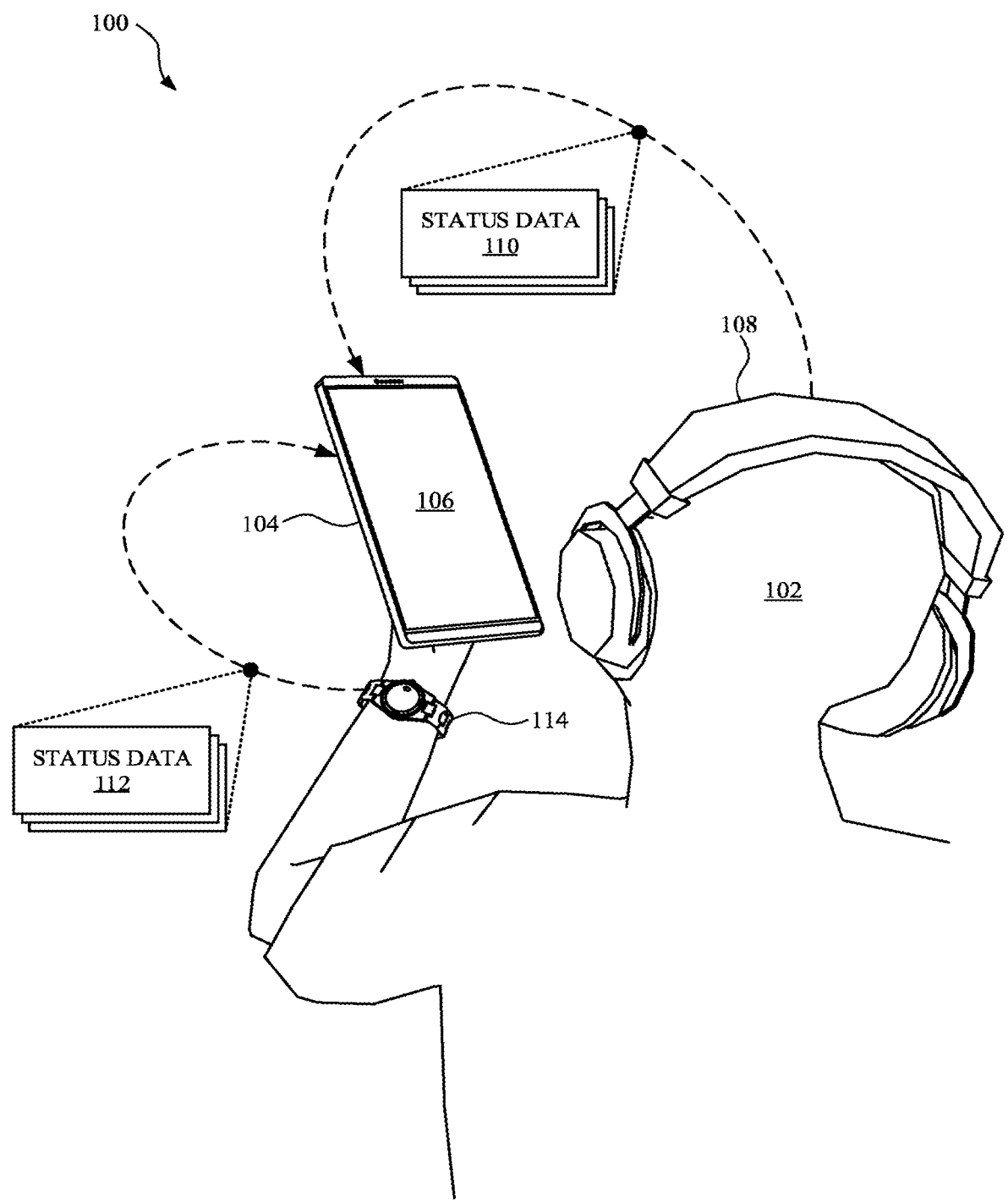
FIG. 1A, FIG. 1B, and FIG. 1C illustrate views of one or more peripheral devices proactively communicating status data in furtherance of reducing latency exhibited by an automated assistant that responds to device-related inquiries.
Figure 1B:
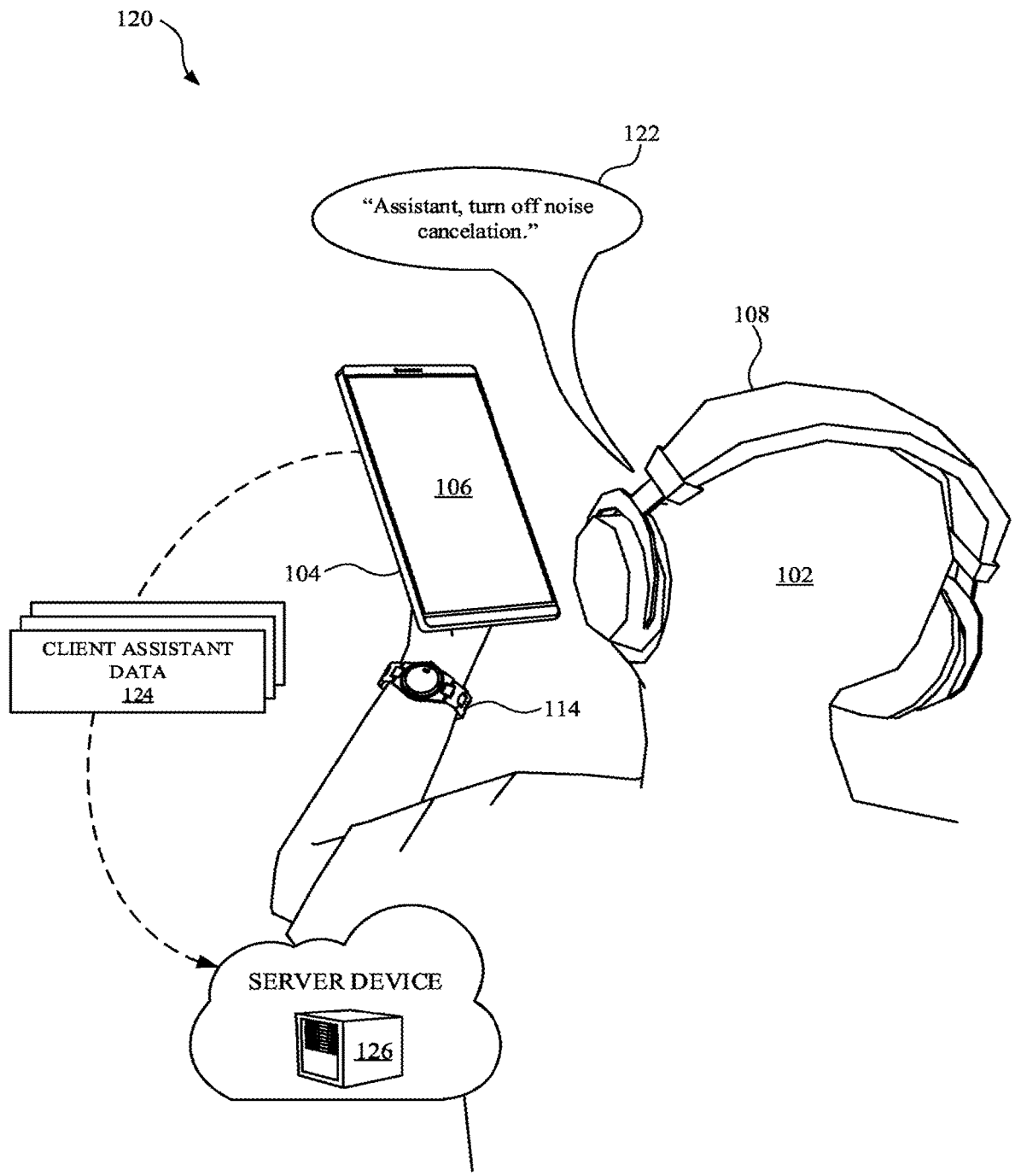
Figure 1C:
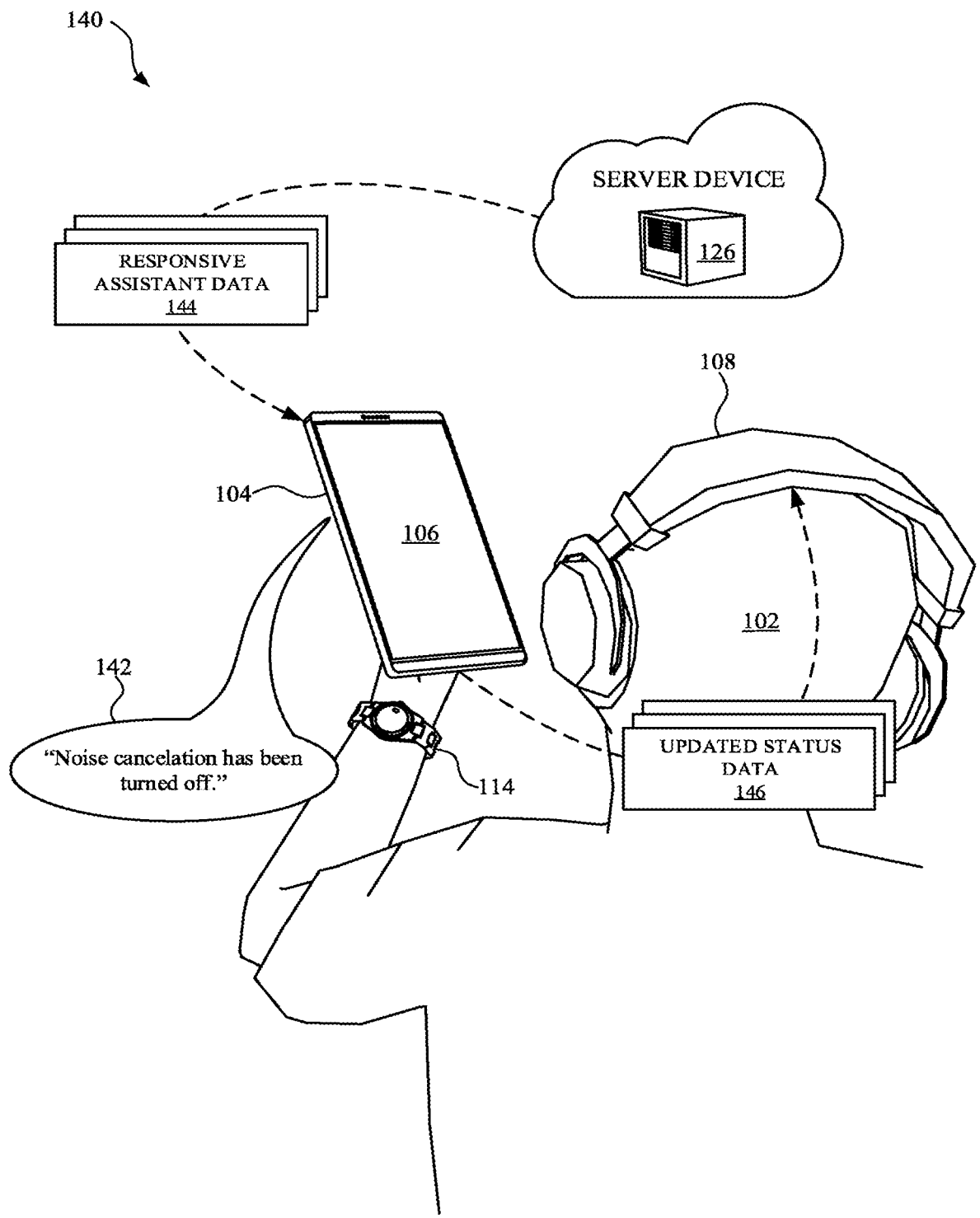

FIG. 1A, FIG. 1B, and FIG. 1C illustrates a view 100, a view 120, and a view 140 of one or more peripheral devices proactively communicating status data in furtherance of reducing latency exhibited by an automated assistant that responds to device-related inquiries. For example, FIG. 1A illustrates a view 100 of a first device 108 (e.g., a pair of wearable audio devices) and a second device 114 (e.g., computerized watch) providing status data 110 and status data 112, respectively, to a computing device 104. The status data can be provided proactively, without an application of the computing device 104 necessarily soliciting the first device 108 and the second device 114 for status data. Each of the first device 108 and the second device 114 can include one or more interfaces for receiving user inputs that can invoke an automated assistant application of the computing device 104. For example, the user 102 can provide an invocation phrase (e.g., "Assistant . . . ") that can be detected by a microphone of the first device 108 and, in response, the first device 108 can communicate with the computing device 104 to initialize the automated assistant. However, without the user 102 providing the invocation phrase or otherwise soliciting the automated assistant, the first device 108 can proactively provide the status data 110 to the computing device 104 and the second device 114 can proactively provide status data 112 to the computing device 104.

The status data can indicate one or more settings and/or more states of a respective device and/or application, and/or can indicate a status of one or more operations of a respective device and/or application. For example, status data 110 can indicate that the first device 108 has a battery charge level of 35%, is named "Kaiser Headphones," and does not have "noise cancelation" active. Additionally, or alternatively, status data 112 can indicate a name of the second device 114 (e.g., "Kaiser Watch"), battery charge level is at 77%, health monitoring is "active," and lower power mode is off (e.g., "0"). Subsequent to each device providing their respective status data, the user 102 can provide a spoken utterance 122 such as, "Assistant, turn off cancelation," to the computing device 104. This spoken utterance 122 can embody a request for the automated assistant to modify a setting of the first device 108 by providing a communication between the computing device 104 and the first device 108 via a direct wireless connection (e.g., Bluetooth, ZigBee, and/or any other wireless communication protocol) or wired connection.

In response to receiving the spoken utterance 122, the automated assistant and/or the computing device 104 can provide client assistant data 124 to a server device 126. The computing device 104 can provide the client assistant data 124 to the server device 126 to offload computational tasks of the computing device 104. For example, in some implementations, the client assistant data 124 can embody audio data or other data characterizing the spoken utterance 122 provided by the user 102. In this way, speech processing and/or other input processing can be performed at the server device 126 in order to preserve computational resources at the computing device 104. In some implementations, the computing device 104 can convert the status data received from each device (e.g., the first device 108 and the second device 114) from a first format to a second format that is different from the first format. In some implementations, the first format of the status data can occupy less memory than the second format of the status data. Alternatively, or additionally, the first format of the status data can be a binary message format and the second format of the status data can be a non-binary message format. Alternatively, or additionally, the first format and the second format can correspond to serialized data formats, wherein the first format has a smaller range of acceptable characters than a range of acceptable characters for the second format (e.g., lowercase letters acceptable).

The client assistant data 124 provided to the server device 126 can embody all the information conveyed by the status data 110 and the status data 112, or less than all of the information conveyed by the status data 110 and the status data 112. Alternatively, or additionally, the status data 110 can identify multiple different states of the first device 108, and the client assistant data 124 can identify less than a total number of states of the multiple different states. In some implementations, portions of information conveyed by the status data can be subject to one or more conditions before being communicated to the server device 126. For example, the computing device 104 and/or the automated assistant can determine that the status data 110 indicates that the battery charge level of the first device 108 is 35%. The automated assistant can compare this battery charge level to a battery charge threshold and determine that the battery charge level satisfies the charge threshold (e.g., battery charge is less than 50%). Based on this determination, the automated assistant can generate the client assistant data 124 to include data characterizing the battery charge level of the first device 108. Otherwise, when the battery charge level does not satisfy the charge threshold, the automated assistant can omit the data regarding the battery charge level of the first device 108.

When the server device 126 receives the client assistant data 124, the server device 126 can process the client assistant data 124 to identify one or more requests submitted by the user 102 via the assistant input (e.g., spoken utterance 122). For example, the server device 126 can perform NLU and/or ASR processing on audio data embodied in the client assistant data 124. Based on this processing, the server device 126 can identify a user intent and/or operation that the user 102 is requesting that the automated assistant perform (e.g., increasing noise cancelation of the first device 108). The server device 126 can determine that the user 102 is requesting that the automated assistant adjust a setting of the first device 108 and, based on this determination, access the status data that is embodied in the client assistant data 124. For example, the client assistant data 124 can include status data that indicates a current setting for noise cancelation at the first device 108 (e.g., "active").

In some implementations, the server device 126 can generate responsive assistant data 144 for providing to the computing device 104. The responsive assistant data 144 can characterize one or more updated settings for the first device 108, at least based on determining that the assistant input from the user 102 includes a request for the automated assistant to modify a setting of the first device 108. In some implementations, the responsive assistant data 144 can also include natural language content and/or other data characterizing a response for the automated assistant to provide to the user 102. For example, based on the responsive assistant data 144, the automated assistant can provide a responsive output 142 such as, "Noise cancelation has been turned off." Alternatively, or additionally, the automated assistant can render natural language content at a display interface 106 of the computing device 104 to indicate that the desired setting (e.g., noise cancelation) has been modified.

In some implementations, the automated assistant can convert updated status data 146 embodied in the responsive assistant data 144 from a second format to a first format to be communicated to the first device 108. For example, the automated assistant and/or the computing device 104 can convert updated status data 146 included in the responsive assistant data 144 from a non-binary message format to a binary message format. The updated status data 146 in the second format can then be communicated to the first device 108 for execution, as illustrated in view 140 of FIG. 1C. When received by the first device 108, the first device 108 can then modify a corresponding setting of the first device 108 accordingly and, optionally, provide an indication to the computing device 104 that the corresponding setting has been modified.

Figure 2:
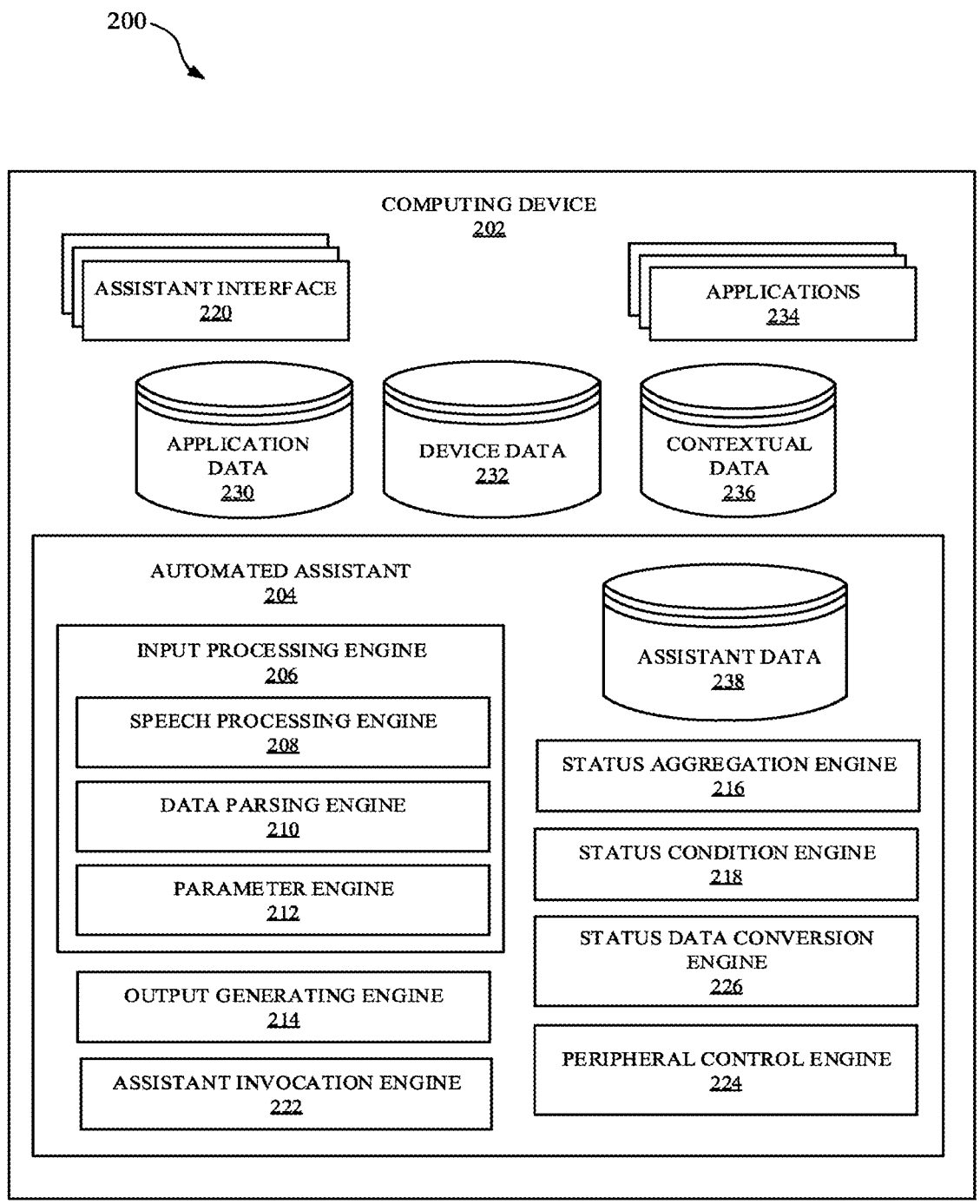
FIG. 2 illustrates a system that provides an automated assistant that proactively receives status data from other connected devices, and appends the status data to server requests that are generated in response to user inputs to the automated assistant.

FIG. 2 illustrates a system 200 that provides an automated assistant 204 that proactively receives status data from other connected devices, and appends the status data to server requests that are generated in response to user inputs to the automated assistant 204. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, touch interface, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a particular state of each application of the one or more applications 234 and/or a particular state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant.

When the one or more trained machine learning models are trained according to these instances of training data, the assistant invocation engine 222 can cause the automated assistant 204 to detect, or limit detecting, spoken invocation phrases from a user based on features of a context and/or an environment. Additionally, or alternatively, the assistant invocation engine 222 can cause the automated assistant 204 to detect, or limit detecting for one or more assistant commands from a user based on features of a context and/or an environment. In some implementations, the assistant invocation engine 222 can be disabled or limited based on the computing device 202 detecting an assistant suppressing output from another computing device. In this way, when the computing device 202 is detecting an assistant suppressing output, the automated assistant 204 will not be invoked based on contextual data 236—which would otherwise cause the automated assistant 204 to be invoked if the assistant suppressing output was not being detected.

In some implementations, the system 200 can include a status aggregation engine 216 for aggregating data from one or more different computing devices that can be associated with the automated assistant 204 and/or a user. For example, a peripheral device such as a pair of earbuds (i.e., headphones) can provide status data via a direct wireless connection to the computing device 202. Another peripheral device, such as a smart watch, can also provide other status data via another direct wireless connection to the computing device 202. These instances of status data 216 can be received by the status aggregation engine 216 and communicated to a separate server device when a user provides an input to the automated assistant 204.

In some implementations, the system 200 can include a status condition engine 218 that can process received status data for determining whether certain status data satisfies one or more conditions. For example, one or more conditions can be associated with a particular type of status such that, when the one or more conditions are satisfied, any status data corresponding to the particular type of status can be communicated to the server device. Otherwise, the particular type of status may not be provided to the server device in response to a user input to the automated assistant 204. For example, a user may provide a request to the automated assistant 204 when the user is not wearing both of their ear buds. This status of the earbuds may satisfy a condition for not communicating status data associated with the ear buds to the server device. In this way, the status condition engine 218 can determine that the condition associated with the ear buds is satisfied and may bypass appending ear bud related status data to client assistant data communicated to the server device. This can preserve network bandwidth and memory when the user is providing assistant inputs that are not likely to affect a particular state of a device.

In some implementations, the system 200 can include a status data conversion engine 226, which can convert status data received from a peripheral device into different formats. For example, a peripheral device such as a watch can provide status data to the computing device 202 in a protocol buffer format. The status data conversion engine 226 can convert the status data into a different format, such as a serialized data format that includes natural language content (e.g., a JSON format). The status aggregation engine 216 can then communicate the status data in the serialized data format to the server device for processing. Additionally or alternatively, the status data conversion engine 226 can convert the status data from the non-binary message format (e.g., JSON format) to a binary message format (e.g., protocol buffer format) for communicating updated status data back to a peripheral device. A peripheral control engine 224 can provide the updated status data back to the peripheral device in the binary message format in order to control the peripheral device and/or otherwise fulfill a user request related to the peripheral device.

Figure 3:
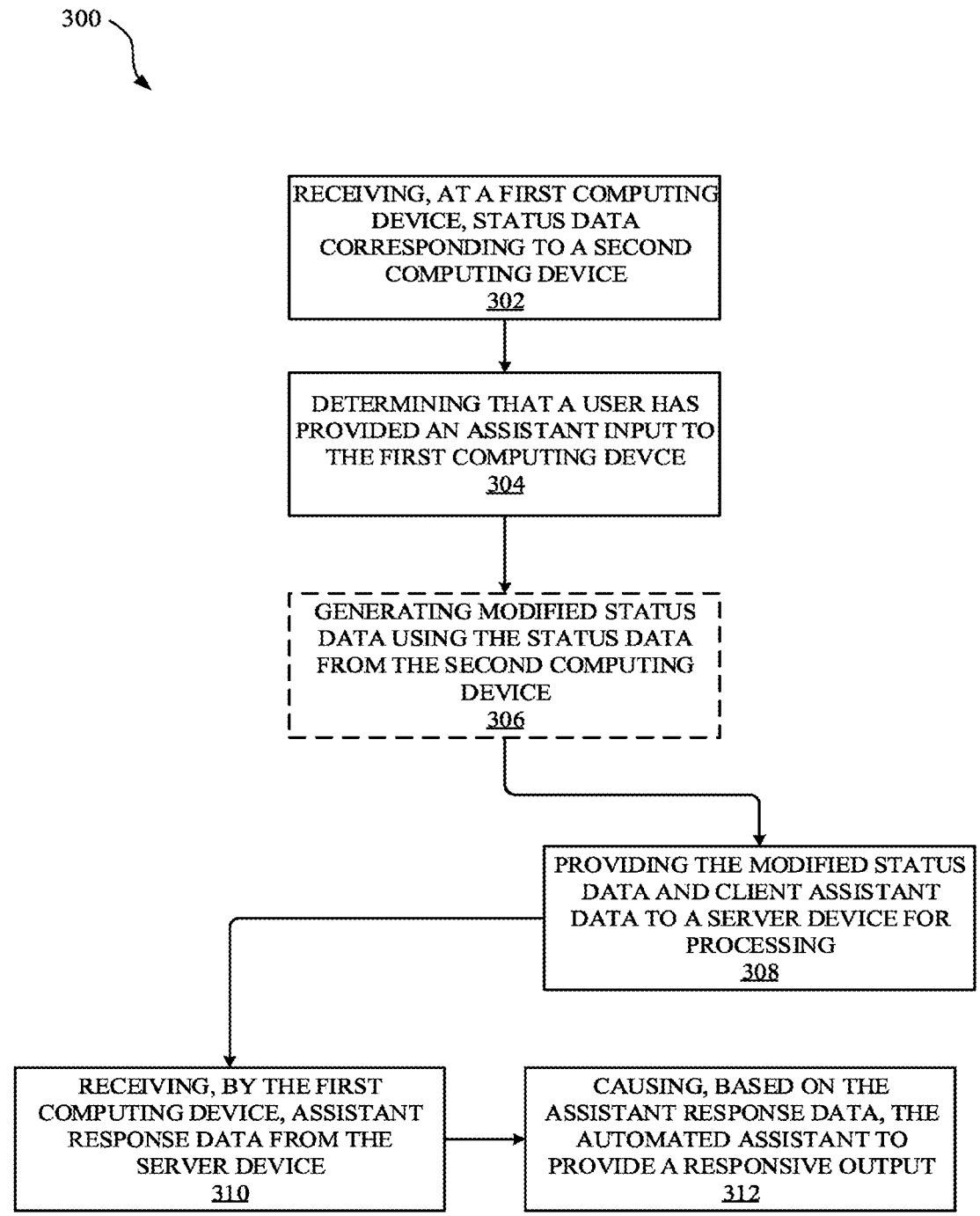
FIG. 3 illustrates a method for proactively appending device status data to a client assistant communication in furtherance of reducing latency when a user interacts with an automated assistant via a first computing device for controlling a second computing device.

FIG. 3 illustrates a method 300 for proactively appending device status data to a client assistant communication in furtherance of reducing latency when a user interacts with an automated assistant via a first computing device for controlling a second computing device. The method 300 can be performed by one or more computing devices, applications, and/or any other apparatus or module that can be associated with an automated assistant. The method 300 can include an operation 302 of receiving, at a first computing device, status data corresponding to a second computing device that is in communication with the first computing device. For example, the first computing device can be a tablet computing device and the second computing device can be a watch device. The second computing device can be connected to the first computing device via a direct wireless communication such as, but not limited to, a Bluetooth connection. The second computing device can exhibit a status that is effectuated by one or more different settings. For example, when the second computing device is a watch device, the watch device can have a setting for toggling exercise-related notifications that may be rendered via a vibration transmitter and/or other interface of the watch device. A value for this setting (e.g., on or off) can be embodied in status data that is proactively communicated from the second computing device to the first computing device.

The method 300 can proceed from the operation 302 to an operation 304 of determining that a user has provided an assistant input to the first computing device. The assistant input can be directed to an automated assistant application of the first computing device, and the automated assistant application can be assisted by a separate server device. For example, when the assistant input is a spoken utterance from the user, audio data that embodies the spoken utterance can be communicated to the server device in order to reduce a computational load of the first computing device. The assistant input can be directed to the automated assistant for controlling a setting of the second computing device. For example, the user can provide a spoken utterance such as, "Assistant, turn off notifications for exercise." The method 300 can proceed from the operation 304 to an optional operation 306.

The optional operation 306 can include generating modified status data using the status data from the second computing device. The modified status data can consume less memory than the status data from the second computing device and can identify all, or less than all, of the settings and/or statuses identified by the status data from the second computing device. In addition to the modified status data consuming less memory than the status data, it is also noted that the modified status data, when transmitted in lieu of the status data at operation 308, can consume less bandwidth than the status data. As one example, the status data can be provided by the second computing device in a binary message format and can be converted, by the first computing device, into a lower data size non-binary message format. For instance, the second computing device can provide the status data in a serialized binary message format, and the first computing device can convert the status data into another format such as, but not limited to, a natural language format (e.g., JavaScript Object Notation). As one particular instance, the other format can indicate a particular one of a plurality of defined categories of candidate states for the second computing device, and the particular one can be selected by the first computing device based on the contents of the status data from the second computing device. A mapping or other data structure defining relations between received status data and corresponding categories can be used, by the first computing device, in selecting the particular one and can optionally be periodically updated. This can enable new mappings and/or new categories to be defined at the first computing device, without necessitating any corresponding updates at the second computing device. The method 300 can proceed from the operation 306, or the operation 304, to an operation 308.

The operation 308 can include providing the modified status data and client assistant data to the server device for processing. The client assistant data can characterize the assistant input provided by the user to the automated assistant. The server device can process the assistant input data using one or more NLU and/or ASR processes, in order to identify one or more requests embodied in the assistant input. Alternatively, or additionally, the server device can process the client assistant data using one or more heuristic processes and/or trained machine learning models. Based on this processing, the server device can determine that the user is requesting that the exercise notifications for the second computing device be turned off. The server device can then use the modified status data to identify a particular setting that corresponds to the "exercise notifications," and modify the particular setting. When the particular setting has been identified in the modified status data, the server device can generate assistant response data that can be utilized by the automated assistant for modifying the particular setting. For example, the assistant response data can include updated status data that can be converted, by the first computing device, into another format that can be communicated to the second computing device. Alternatively, or additionally, the assistant response data can include data that characterizes a natural language output to be provided by the automated assistant to indicate that the request from the user has been fulfilled.

The method 300 can proceed from the operation 308 to an operation 310, which can include receiving, by the first computing device, the assistant response data from the server device. In some implementations, the first computing device and/or the automated assistant can access the updated status data embodied in the assistant response data and convert the updated status data into a format that can be utilized by the second computing device. For example, the first computing device can convert the updated status data from a non-binary message format to a binary message format, and then communicate the updated status data to the second computing device. As a result, the second computing device can receive the updated status data and modify one or more settings of the second computing device according to the updated status data. The method 300 can proceed from the operation 310 to an operation 312, which can include causing, based on the assistant response data, the automated assistant to provide a responsive output. For example, the automated assistant can provide an audible natural language output such as, "The exercise notifications have been turned off," based on the content of the assistant response data and/or an additional communication from the second computing device.

Figure 4:
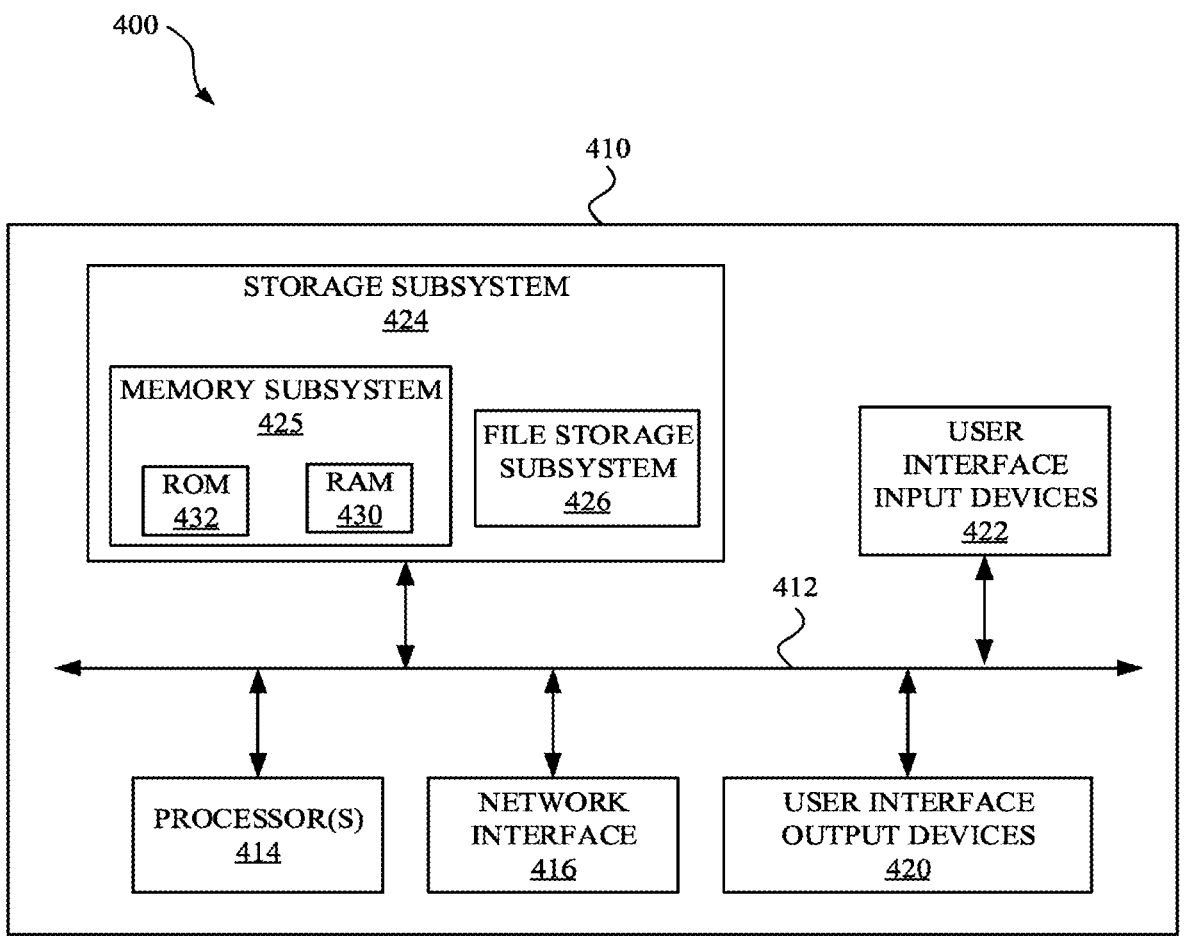
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, automated assistant, computing device 104, first device 108, second device 114, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as receiving, at a first computing device, second device data that characterizes a status of a second computing device, wherein the first computing device provides access to an automated assistant and the second computing device is in communication with the first computing device. The method can further include an operation of, subsequent to receiving the second device data from the second computing device: determining, at the first computing device, that a user provided an input that is directed to the automated assistant. The method can further include an operation of providing, in response to the input from the user, client assistant data to a server device that is separate from the first computing device and the second computing device, wherein the client assistant data is based on the second device data and the input from the user. The method can further include an operation of receiving, from the server device, responsive data that characterizes an assistant response to the input and that is generated based on the client assistant data. The method can further include an operation of causing, based on the responsive data, the first computing device or the second computing device to render the assistant response.

In some implementations, the second device data is received from the second computing device in a binary message format, and the client assistant data is provided to the server device from the first computing device in a non-binary message format. In some implementations, the input is a spoken utterance that embodies a request for the automated assistant to modify the status of the second computing device, and wherein the client assistant data includes: textual content generated based on audio processing of the spoken utterance performed at the first computing device, and non-binary data that characterizes the status of the second computing device. In some implementations, determining that the user provided the input that is directed to the automated assistant includes: determining that the second computing device detected an invocation phrase for initializing the automated assistant. In some implementations, the status of the second device characterizes multiple different states of the second computing device, and the method further comprises: generating, based on the input from the user, the client assistant data, wherein the client assistant data identifies less than a total number of states of the multiple different states of the second computing device.

In some implementations, the method can further include determining, based on the second device data, that a particular state of the multiple different states does not satisfy a condition for communicating the particular state to the server device, wherein the client assistant data identifies less than the total number of states of the multiple different states based on the particular state of the multiple different states not satisfying the condition. In some implementations, the particular state corresponds to a battery charge level of the second computing device, and the condition for communicating the particular state to the server device is satisfied when the battery charge level satisfies a battery charge threshold. In some implementations, the second computing device includes a pair of wearable audio devices, and the condition for communicating the particular state to the server device is satisfied when none of the wearable audio devices of the pair of wearable audio devices are being worn by the user. In some implementations, the method can further include converting the second device data into a non-binary format that consumes less memory than the second device data, wherein the client assistant data embodies a portion of the non-binary format of the second device data.

In other implementations, a method implemented by one or more processors is set forth as including operations such as receiving, at a server device, client assistant data that characterizes: an assistant input provided by a user to an automated assistant that is accessible via a first computing device, and a status of a second computing device that is in communication with the first computing device, wherein the assistant input is provided to the first computing device by the user subsequent to the second computing device providing status data to the first computing device for indicating the status of the second computing device. The method can further include an operation of generating, based on the client assistant data, assistant response data that characterizes a response for the automated assistant to provide to the user via the first computing device or the second computing device. The method can further include an operation of providing, by the server device, the assistant response data to the first computing device. The method can further include an operation of causing, based on the assistant response data, the automated assistant at the first computing device to render natural language content that is responsive to the assistant input and is based on the status of the second computing device.

In some implementations, the client assistant data is received by the server device in a non-binary message format, and the status data is communicated from the second computing device to the first computing device in a binary message format. In some implementations, the assistant input is a spoken utterance that embodies a request for the automated assistant to modify the status of the second computing device, and the client assistant data includes: textual content generated based on audio processing of the spoken utterance performed at the first computing device, and non-binary data that characterizes the status of the second computing device. In some implementations, the status characterized by the client assistant data identifies less than a total number of states of multiple different states of the second computing device, and the status data identifies more states than a number of states identified by the status received by the server device. In some implementations, the status characterized by the client assistant data indicates a noise cancelation setting of the second computing device, and the method further comprises: causing, based on the assistant response data, the first computing device to modify the noise cancelation setting of the second computing device.

In yet other implementations, a method implemented by one or more processors is set forth as including operations such as receiving, by a first computing device, various status data from multiple different computing devices associated with the first computing device, wherein the various status data indicates statuses of multiple different devices that are associated with an automated assistant that is accessible via the first computing device. Subsequent to the first computing device receiving the status data: generating, based on the various status data, modified status data that is different than the various status data received from the multiple different computing device. The method can further include an operation of determining, by the first computing device, that a user provided an assistant input to the automated assistant. The method can further include an operation of providing, by the first computing device, client assistant data to a server device, wherein the client assistant data includes at least a portion of the modified status data and is based on the assistant input. The method can further include an operation of receiving, from the server device, assistant response data that characterizes a modification to one or more settings of a second computing device of the multiple different computing devices. The method can further include an operation of causing, based on the assistant response data, the one or more settings of the second computing device to be modified in accordance with the assistant response data.

In some implementations, the method further includes identifying, based on the assistant response data, a particular computing device that the user is directing the assistant input, wherein the particular computing device is the second computing device. In some implementations, the modified status data identifies at least one device of the multiple different computing devices that the assistant input is not directed to. In some implementations, generating the modified status data based on the various status data includes: converting the various status data from a binary message format to a serialized data format that includes natural language content. In some implementations, the client assistant data includes audio data that characterizes the assistant input provided by the user to the automated assistant. In some implementations, the method can further include determining, in response to receiving the assistant input, that a status of the second computing device satisfies one or more conditions for communicating the status to the server device, wherein the status of the second computing device is embodied in the portion of the modified status data.

We claim:

1. A method implemented by one or more processors, the method comprising:
    receiving, at a first computing device, second device data that characterizes a status of a second computing device,
        wherein the first computing device provides access to an automated assistant and the second computing device is in communication with the first computing device;
    subsequent to receiving the second device data from the second computing device:
    determining, at the first computing device, that a user provided an input at the first computing device that is directed to the automated assistant;
    providing, via the first computing device and in response to the input from the user, client assistant data to a server device that is separate from the first computing device and the second computing device,
        wherein the client assistant data is based on both:
            the second device data received at the first computing device prior to the input being provided at the first computing device, and
            the input from the user;
    receiving, from the server device, responsive data that characterizes an assistant response to the input and that is generated based on the client assistant data; and
    causing, based on the responsive data, the first computing device or the second computing device to render the assistant response.

2. The method of claim 1,
    wherein the second device data is received from the second computing device in a binary message format, and
    wherein the client assistant data is provided to the server device from the first computing device in a non-binary message format.

3. The method of claim 2,
wherein the input is a spoken utterance that embodies a request for the automated assistant to modify the status of the second computing device, and
wherein the client assistant data includes:
textual content generated based on audio processing of the spoken utterance performed at the first computing device, and
non-binary data that characterizes the status of the second computing device.

4. The method of claim 3, wherein determining that the user provided the input that is directed to the automated assistant includes:
determining that the second computing device detected an invocation phrase for initializing the automated assistant.

5. The method of claim 1, wherein the status of the second device characterizes multiple different states of the second computing device, and the method further comprises:
generating, based on the input from the user, the client assistant data, wherein the client assistant data identifies less than a total number of states of the multiple different states of the second computing device.

6. The method of claim 5, further comprising:
determining, based on the second device data, that a particular state of the multiple different states does not satisfy a condition for communicating the particular state to the server device,
wherein the client assistant data identifies less than the total number of states of the multiple different states based on the particular state of the multiple different states not satisfying the condition.

7. The method of claim 6,
wherein the particular state corresponds to a battery charge level of the second computing device, and
wherein the condition for communicating the particular state to the server device is satisfied when the battery charge level satisfies a battery charge threshold.

8. The method of claim 6,
wherein the second computing device includes a pair of wearable audio devices, and
wherein the condition for communicating the particular state to the server device is satisfied when none of the wearable audio devices of the pair of wearable audio devices are being worn by the user.

9. The method of claim 1, further comprising:
converting the second device data into a non-binary format that consumes less memory than the second device data,
wherein the client assistant data embodies a portion of the non-binary format of the second device data.

10. A method implemented by one or more processors, the method comprising:
receiving, at a server device, client assistant data that characterizes:
an assistant input provided by a user to an automated assistant that is accessible via a first computing device, and
a status of a second computing device that is in communication with the first computing device,
wherein the assistant input is provided to the first computing device by the user subsequent to the second computing device providing status data to the first computing device for indicating the status of the second computing device;
generating, based on the client assistant data, assistant response data that characterizes a response for the automated assistant to provide to the user via the first computing device or the second computing device;
providing, by the server device, the assistant response data to the first computing device; and
causing, based on the assistant response data, the automated assistant at the first computing device to render natural language content that is responsive to the assistant input and is based on the status of the second computing device.

11. The method of claim 10,
wherein the client assistant data is received by the server device in a non-binary message format, and
wherein the status data is communicated from the second computing device to the first computing device in a binary message format.

12. The method of claim 11,
wherein the assistant input is a spoken utterance that embodies a request for the automated assistant to modify the status of the second computing device, and
wherein the client assistant data includes:
textual content generated based on audio processing of the spoken utterance performed at the first computing device, and
non-binary data that characterizes the status of the second computing device.

13. The method of claim 10,
wherein the status characterized by the client assistant data identifies less than a total number of states of multiple different states of the second computing device, and
wherein the status data identifies more states than a number of states identified by the status received by the server device.

14. The method of claim 10, wherein the status characterized by the client assistant data indicates a noise cancelation setting of the second computing device, and the method further comprises:
causing, based on the assistant response data, the first computing device to modify the noise cancelation setting of the second computing device.

15. A computing device comprising:
memory storing instructions;
one or more processors operable to execute the instructions to:
receive second device data that characterizes a status of a second computing device,
wherein the computing device provides access to an automated assistant and the second computing device is in communication with the computing device;
subsequent to receiving the second device data from the second computing device:
determine that a user provided an input, at the computing device, that is directed to the automated assistant;
provide, via the computing device and in response to the input from the user, client assistant data to a server device that is separate from the computing device and the second computing device,
wherein the client assistant data is based on both:
the second device data received at the computing device prior to the input being provided at the computing device, and the input from the user;

receive, from the server device, responsive data that characterizes an assistant response to the input and that is generated based on the client assistant data; and cause, based on the responsive data, the computing device or the second computing device to render the assistant response.

16. The computing device of claim 15, wherein the second device data is received from the second computing device in a binary message format, and wherein the client assistant data is provided to the server device from the computing device in a non-binary message format.

17. The computing device of claim 16, wherein the input is a spoken utterance that embodies a request for the automated assistant to modify the status of the second computing device, and wherein the client assistant data includes:

textual content generated based on audio processing of the spoken utterance performed at the computing device, and non-binary data that characterizes the status of the second computing device.

18. The computing device of claim 17, wherein in determining that the user provided the input that is directed to the automated assistant one or more of the processors are to:

determine that the second computing device detected an invocation phrase for initializing the automated assistant.

* * * * *